US008971712B2

(12) United States Patent
Fan et al.

(10) Patent No.: US 8,971,712 B2
(45) Date of Patent: Mar. 3, 2015

(54) CARRIER EMBEDDED OPTICAL RADIO-SIGNAL MODULATION OF HETERODYNE OPTICAL CARRIER SUPPRESSION

(71) Applicant: Georgia Tech Research Corporation, Atlanta, GA (US)

(72) Inventors: Shu Hao Fan, Atlanta, GA (US); Gee-Kung Chang, Smyrna, GA (US); Cheng Liu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 71 days.

(21) Appl. No.: 13/784,061

(22) Filed: Mar. 4, 2013

(65) Prior Publication Data
US 2013/0230328 A1 Sep. 5, 2013

Related U.S. Application Data

(60) Provisional application No. 61/606,789, filed on Mar. 5, 2012.

(51) Int. Cl.
*H04B 10/00* (2013.01)
*H04B 10/2575* (2013.01)
(52) U.S. Cl.
CPC ...... *H04B 10/2575* (2013.01); *H04B 10/25759* (2013.01)
USPC ............................ 398/115; 398/116; 398/117
(58) Field of Classification Search
USPC ................................................ 398/115–116
See application file for complete search history.

(56) References Cited

U.S. PATENT DOCUMENTS

2010/0046962 A1 2/2010 Yu
2011/0069964 A1 3/2011 Yu

OTHER PUBLICATIONS

Chen et al, A Novel Full-Duplex ROF System Based on Pilot Tone Injection and FBG Grating (published in International Symposium on Signals, Systems, and Electronics vol. 1, pp. 104, Sep. 2010).*

(Continued)

*Primary Examiner* — David Payne
*Assistant Examiner* — Casey Kretzer
(74) *Attorney, Agent, or Firm* — Troutman Sanders LLP; Ryan A. Schneider; Mark L. Jones

(57) ABSTRACT

Certain implementations of the disclosed technology may include systems, methods, and apparatus for carrier-embedded optical radio-over-fiber (RoF) communications. Example embodiments of the method may include modulating a baseband signal with and an intermediate frequency (IF) and a radio frequency (RF) carrier signal to produce a RF modulated optical signal, transmitting the RF modulated optical signal to a remote access point with an optical fiber, and detecting the transmitted RF modulated optical signal. The method may also include receiving a RF uplink signal and mixing a harmonic of the RF carrier signal with the received RF uplink signal to down-convert the received RF uplink signal to an IF uplink signal. The method may include modulating a second optical source with the IF uplink signal to produce an IF uplink optical signal, transmitting the IF uplink optical signal via an optical fiber, and detecting the IF uplink optical signal.

24 Claims, 9 Drawing Sheets

(56) References Cited

OTHER PUBLICATIONS

Jia, Zhensheng et al., "Multiband Signal Generation and Dispersion-Tolerant Transmission Based on Photonic Frequency Tripling Technology for 60-GHz Radio-Over-Fiber Systems," IEEE Photonics Technology Letters, vol. 20, No. 17, Sep. 1, 2008, pp. 1470-1472.

Zhou, M. T. et al., "Radio-over-Fiber Transmission of 1.25 Gigabit Ethernet Signal on 60-GHz Band Subcarrier with Performance Improvement and Wavelength Reuse," IEEC Communication Society, ICC 2007 Proceedings, pp. 2151-2155.

Fan, Shu-Hao et al., "Full-Duplex 60 GHz Vector-Signal Radio-over-Fiber System Using Heterodyne Optical-Carrier Suppression," 2011 Optical Society of America.

Chapter 3, Coverage-Extended Wireless-Over-Fiber System, Inventor Thesis, pp. 1-51.

* cited by examiner

Optical Spectrum of OCS

Type I
Optical Spectrum of HeteroOCS

Type II
Optical Spectrum of HeteroOCS

Type III
Optical Spectrum of HeteroOCS

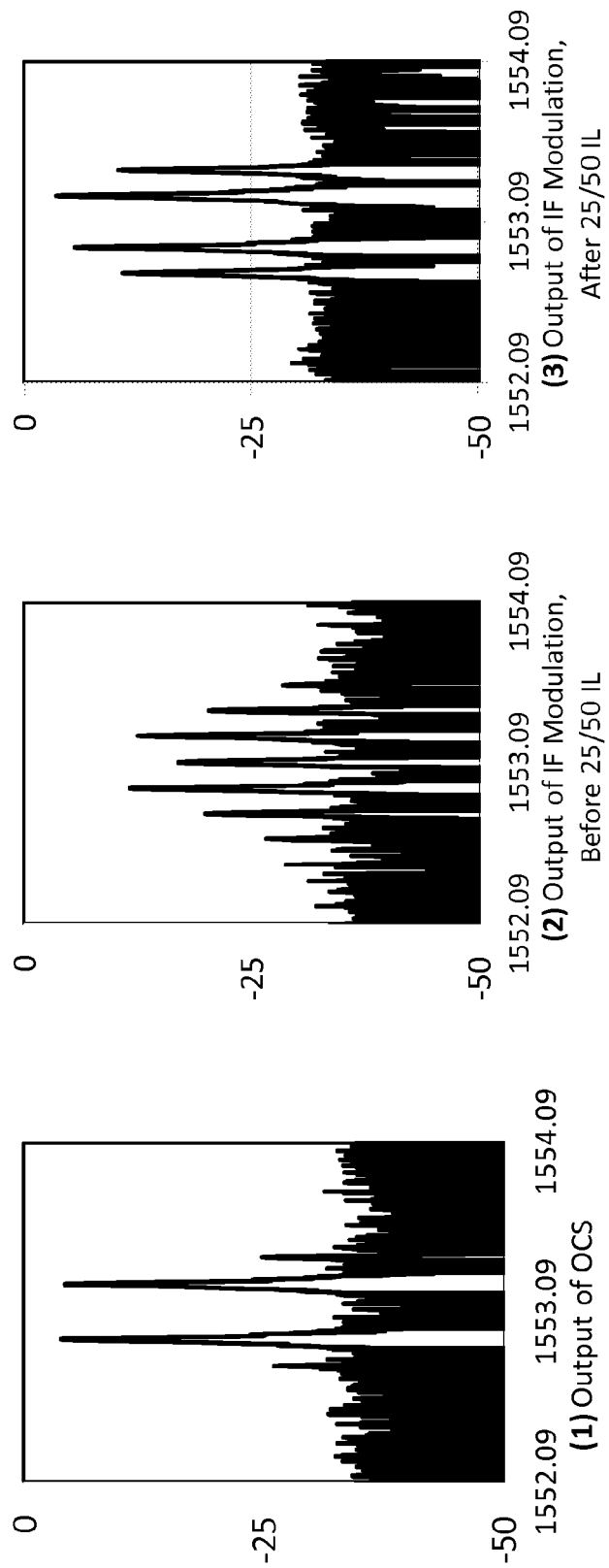

CARRIER EMBEDDED OPTICAL RADIO-SIGNAL MODULATION OF HETERODYNE OPTICAL CARRIER SUPPRESSION

RELATED APPLICATIONS

This Application claims benefit under 35 USC §119(e) of U.S. Provisional Patent Application Ser. No. 61/606,789, entitled "RF-Carrier Embedded Optical Radio-Signal Modulation of Heterodyne Optical Carrier Suppression" and filed Mar. 5, 2012, which is herein incorporated by reference as if fully set forth below in its entirety.

BACKGROUND

The disclosed technology relates generally to communications, and more specifically to radio-over-fiber high-speed data communications.

RELATED ART

With the proliferation of the Internet, access through both wired and wireless data connections has resulted in an explosion of data usage. Data usage can include, but is not limited to, music and video, web browsing, and e-mail. In addition, this data can be downloaded to a device or streamed directly (i.e., playback in real time). As a result, Internet data traffic is predicted to quadruple worldwide in the coming years. Total Internet data usage, for example, is predicted to reach approximately 80.5 exabytes (billion gigabytes) per month by 2015. To put that in perspective, 80 exabytes would fill 20 billion DVDs.

As a result, high-speed, high-bandwidth techniques utilizing millimeter-wave (mmWave) carriers are of increasing interest. Due to their higher frequencies, mmWaves can easily occupy a much wider bandwidth for wireless transmission. Among all the mmWave frequencies, i.e., from 30 GHz to 300 GHz, the mmWave that draws particular attention of late is the 60-GHz band.

One reason for this attention is because the RF carriers in the 60-GHz band are highly absorbed by the atmosphere, particularly by oxygen molecules, and the atmospheric absorption may restrict the applications of 60-GHz mmWaves to relatively short distance use, generally on the order of tens of meters. As a result, the 60-GHz band is license-free in most nations, and no license is currently required from the FCC in the U.S. for 60-GHz band. In fact, the FCC recently allocated full spectrum of unlicensed frequencies in the 57-64 GHz spectrum. As a result, 60-GHz bands hold great potential for indoor and short-range transmission, for example, wireless access points (WAP) for home Internet use. However several fundamental limitations remain that may slow down the practical application of mmWaves.

What is needed, therefore, is a system and method for exploiting the advantages of the 60 GHz bands, while overcoming the limitations and shortcomings thereof.

SUMMARY

Some or all of the above needs may be addressed by certain implementations of the disclosed technology. Certain implementations may include carrier embedded optical radio-signal modulation of heterodyne optical carrier suppression.

According to an example implementation, a method is provided for carrier-embedded optical radio-over-fiber (RoF) communications. Example embodiments of the method may include modulating, at a Radio-over-Fiber (RoF) Gateway Router, an electronic baseband signal with an intermediate frequency (IF) signal and a radio frequency (RF) carrier signal to produce a RF modulated optical signal. The method may include transmitting, by a first optical fiber, the RF modulated optical signal from the RoF Gateway Router to a remote access point, and detecting, at the remote access point, the transmitted RF modulated optical signal to produce an electrical access point signal. The method may also include filtering the access point signal to pass a harmonic of the RF carrier signal to an uplink section of the access point, receiving a RF uplink signal, mixing the harmonic of the RF carrier signal with the received RF uplink signal to down-convert the received RF uplink signal to an IF uplink signal, modulating a second optical source with the IF uplink signal to produce an IF uplink optical signal, transmitting, by a second optical fiber, the IF uplink optical signal from the remote access point to the RoF Gateway Router, and detecting, at the RoF Gateway Router, the IF uplink optical signal.

According to another example implementation, a system is for providing carrier-embedded optical radio-over-fiber (RoF) communications. The system may include a Radio over Fiber (RoF) Gateway Router that includes a first optical source, an optical modulator, and a first detector. The system may include a first optical fiber, a second optical fiber, and an access point. The access point may include a second detector, a band pass filter, a RF mixer, and a second optical source. An example embodiment of the system is configured to modulate, at the Radio-over-Fiber (RoF) Gateway Router, an electronic baseband signal with an intermediate frequency (IF) signal and a radio frequency (RF) carrier signal to produce a RF modulated optical signal. The system is configured to transmit, by the first optical fiber, the RF modulated optical signal from the RoF Gateway Router to a remote access point, detect, by the second detector at the remote access point, the transmitted RF modulated optical signal to produce an electrical access point signal. The access point may further filter, with the band pass filter, the access point signal to pass a harmonic of the RF carrier signal to an uplink section of the access point. The access point may receive a RF uplink signal, mix, with the RF mixer, the harmonic of the RF carrier signal with the received RF uplink signal to down-convert the received RF uplink signal to an IF uplink signal and modulate the second optical source with the IF uplink signal to produce an IF uplink optical signal. The system may transmit, by the second optical fiber, the IF uplink optical signal from the remote access point to the RoF Gateway Router; and detect, by the first detector at the RoF Gateway Router, the IF uplink optical signal.

According to another example implementation, an apparatus is provided for carrier-embedded optical radio-over-fiber (RoF) communications. The apparatus may include an access point, which may include a detector, a band pass filter, a RF mixer, and an optical source. The apparatus may further include at least one optical fiber. According to an example embodiment, the apparatus is configured to receive a RF modulated optical signal, the optical signal including a RF carrier signal. The apparatus is configured to detect, by the detector, the RF modulated optical signal to produce an electrical access point signal. The apparatus may be configured to filter, with the band pass filter, the access point signal to pass a harmonic of the RF carrier signal to an uplink section of the access point. The apparatus may be configured to receive a RF uplink signal and mix, with the RF mixer, the harmonic of the RF carrier signal with the received RF uplink signal to down-convert the received RF uplink signal to an IF uplink signal.

The apparatus may modulate the optical source with the IF uplink signal to produce an IF uplink optical signal, and transmit, by the optical fiber, the IF uplink optical signal.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 5a depicts an example of a measured spectrum of an OCS, according to an example implementation.

FIG. 5b depicts an example output measured spectrum of intermediate frequency (IF) modulation OCS (before optical interleaving) associated with a HeteroOCS mmWave generation in a RoF gateway router, according to an example implementation.

FIG. 5c depicts an example output measured spectrum of IF modulation OCS output (after optical interleaving) associated with a HeteroOCS mmWave generation in a RoF gateway router, according to an example implementation.

DETAILED DESCRIPTION

Figure 1:
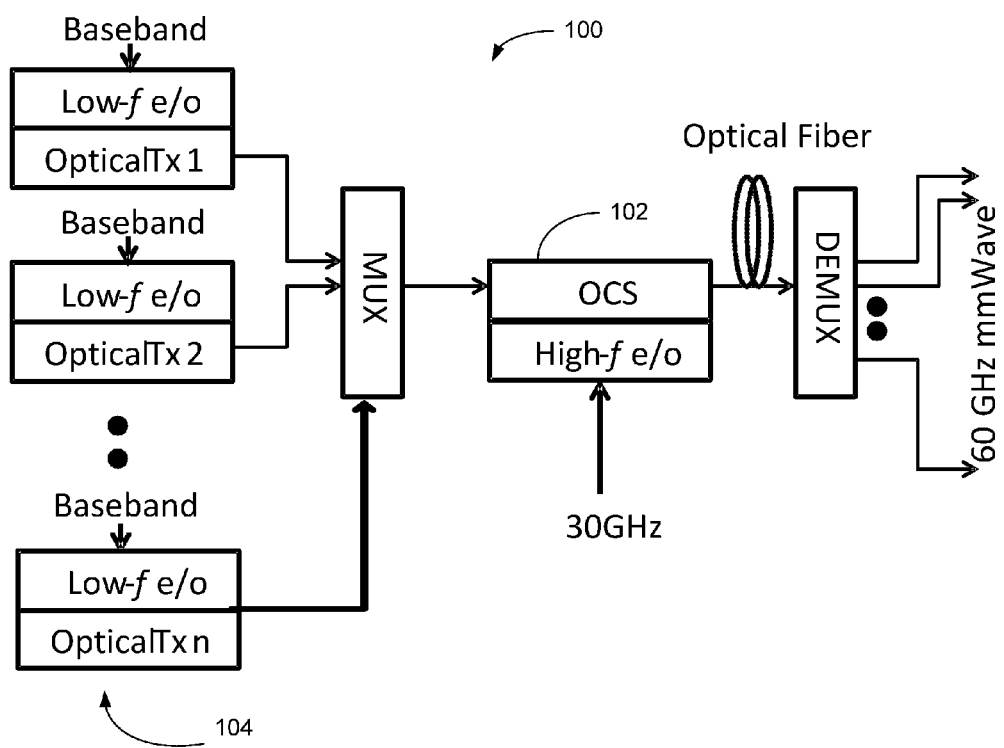
FIG. 1 is a block diagram of an illustrative multi-channel downlink signal generation and transmission system utilizing optical-carrier suppression (OCS), according to an example implementation of the disclosed technology.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments of the present invention relate generally to high speed data transmission, and more specifically to high-speed radio-over-fiber (RoF) transmission, for example, to address certain limitations in the 60 GHz band. Certain example implementations of the disclosed technology utilizing 60 GHz radio-over-fiber (RoF) system may simplify the design and operation of, among other things, wireless access points (WAPs). According to an example implementation, a 60 GHz RoF may provide a cost-effective backhaul network for the very-high-throughput (VHT) multi-gigabit millimeter-wave (mmWave) wireless local-area networks.

In accordance with an example implementation, the disclosed technology provides systems and methods for generating optical radio-signals composed of two optical pure carriers and at least an optical data sideband. In one embodiment, after detected by a photodetector, the use of heterodyne optical-carrier-suppression (HeteroOCS) may provide data signals in the radio-frequency (RF) band and a pure RF carrier. Certain advantages to the disclosed embodiments may include utilizing the RF carrier and eliminating a phase-lock loop and a local oscillator. For example, the pure RF carrier can be used as a frequency source to down-convert the incoming signals in an intermediate frequency (IF) band, which may be easily modulated by a low-frequency optical modulator. Another advantage may include preserving the incoming signals. For example, the pure RF carrier may be spontaneously synchronized with the original source, according to certain example embodiments, and the frequency, phase, and amplitude of the incoming signals may be preserved and unperturbed in the IF band. Example embodiments may improve detector linearity and reduce inter-channel beating frequency.

Example embodiments of the disclosed technology may utilize certain optical modulation methods to generate optical signals of data sideband(s) and two pure optical carriers. In one embodiment, a single optical modulator may be utilized to generate the optical signals having data sideband(s) and two pure optical carriers. In another example implementation, embodiment, one or multiple modulators may be employed to generate optical signals having data sideband(s) and two pure optical carriers. According to an example implementation, various optical configurations may be utilized, including but not limited to planar lightwave circuits, free-space optics or optical fiber components, which may include packaged modulators, optical filters, and optical fibers.

In accordance with example implementations of the disclosed technology, various down-conversion schemes may be utilized to down-convert incoming radio-signals by the pure RF carrier. Example systems and methods may include, but are not limited to the use of passive or active electronics, phase-lock loops, frequency multipliers, direct-detection, superheterodyne, and/or homodyne wireless receivers.

In accordance with an example implementation of the disclosed technology, an optical-carrier suppression (OCS) technique may be employed in the RoF gateway router to meet the electronic/optical (E/O) interface bandwidth requirement by multiplying the RF frequency.

Certain example implementations of the disclosed technology may be utilized to help overcome challenges and/or limitations related to the practical applications of OCS mmWaves. For example, because OCS utilizes the beating of two optical carriers, the phase information may be lost during photon detection. That is, OCS mmWave may be incapable of carrying RF vector signals, such as PSK, QAM, or OFDM. Furthermore, when multiple RF channels are carried by the same OCS mmWave signals, inter-channel beating noise may be generated at an unwanted frequency. For example, if both 60-GHz and 64-GHz mmWave signals are carried by an OCS mmWave, it will generate an interference at 62 GHz because of the square-law operation of the photodetector (PD).

Another challenge that may be addressed by certain implementations of the disclosed technology relates to, for example, an uplink from a mobile wireless transmitter to the RoF gateway router. As may be true for most frequency-multiplying techniques, the uplink 60-GHz signals utilized in conventional mobile wireless transmitters are still unable to return to the RoF gateway router because of the limited bandwidth of the electrical-to-optical interface, which is typically limited to operation below 40 GHz. Most full-duplex 60-GHz RoF lab experiments are demonstrated by down-converted the 60-GHz signals to the baseband without considering the incoming RF phases and carriers. However, in practical wireless transceivers, the baseband down-conversion has to handle the RF carrier/clock recovery and vector demapping, which are carried out in the digital domain. As a result, to implement baseband down-conversion in the WAP may greatly increase cost, which is not consistent to the strength of employing RoF systems for wireless over optical fiber access networks.

In telecommunications, a femtocell is a small, low-power cellular base station, typically designed for use in a home or small business, and it may connect to the service provider's network via broadband (such as DSL or cable), thereby allowing service providers to extend service coverage indoors or at the cell edge, especially where access would otherwise be limited or unavailable.

One challenge of the femtocell infrastructure lies in the backhaul network architecture to support the data transmission among WAPs and from WAPs to the Internet. The network architecture of Ad Hoc meshes, such as the backhaul system used for the wireless-optical broadband access network (WOBAN) may not be suitable here for their long routing delay and poor scalability when there are large numbers of WAPs. On the other hand, a typical wireless backhaul network, such as GSM networks or Fiber-Wireless (FiWi) access networks, is built upon a central-office-to-base-station architecture.

Because wireless transmission distances are mostly limited by high free-space attenuation, many base stations that are deployed for large area coverage are equipped with a RF front-end and a digital back-end to communicate with the central office by the packet-switching transmission. The RF front-end typically handles the RF down-conversion, RF carrier/phase recovery, multi-path interference cancellation, and so on, while the digital back-end includes the multiple-access-control (MAC) protocol and network functions. The complexity of the base stations increases exponentially with the increase of the carrier frequency and the data rate. However, for the 60-GHz technology, it is typically too expensive to have every base station in access networks (or every WAP in femtocell networks) equipped with RF/digital functions at Gb/s operating speed. Because the number of WAPs in the femtocell infrastructure is so large, the system cost is greatly dominated by the cost of each WAP in the femtocell infrastructure.

Instead of transmitting digital packets through optical fibers, embodiments of the disclosed technology include a RoF system that may transport RF signals back and forth between WAPs and an RoF gateway router via optical signals through an optical fiber. In an example implementation, the RF/digital functions may be centralized in the RoF gateway router, and all the RF signals in and out of a mobile device may be directly received and transmitted by a WAP without the digital functions of an RF-front-end. In certain example implementations of the disclosed technology, WAPs may be simplified to only perform optical-electrical (o/e) conversion of RF signals through antennas.

According to an example implementation, a RoF system is provided that may be equivalent to installing one single fully functional WAP, whose wireless signal coverage is extended by optical fibers. For example, the optical fibers of a RoF system may carry RF signals directly from the RoF gateway router to the WAP antennas, or vice versa, so the optical transmission is transparent between the RoF gateway router and any mobile device. Since each WAP is simplified to only have an o/e-conversion function, the cost and power consumption of the RoF femtocell infrastructure can be dramatically reduced.

In accordance with an example implementation, the baseband modulation may be separated from the optical up-conversion, enabling the optical up-conversion to be applied for optical frequency doubling or quadrupling schemes to overcome the e/o-interface bandwidth limitation. Example implementations of the disclosed technology utilize optical up-conversion that may overcome the bandwidth limitation by multiplying the local oscillator (LO) frequency, but transporting RF signals from mobile devices back to the RoF gateway router (the uplink) may still present challenges, especially when the RF is above the bandwidth limitation of the e/o interface. According to certain example implementations of the disclosed technology, indirect mmWave generation may be utilized to address this challenge, and will now be described with reference to the accompanying figures.

FIG. 1 illustrates a block diagram of one example implementation of the disclosed technology utilizing an indirect OCS up-conversion system 100. In this example system 100, multiple optical mmWave channels may share a single high-frequency mmWave electrical-to-optical interface 102 by separating the function of optical mmWave generation and baseband data modulation 104. According to an example implementation, the OCS technique, as disclosed herein may dramatically reduce both the cost and complexity of the entire RoF systems.

Figure 2:
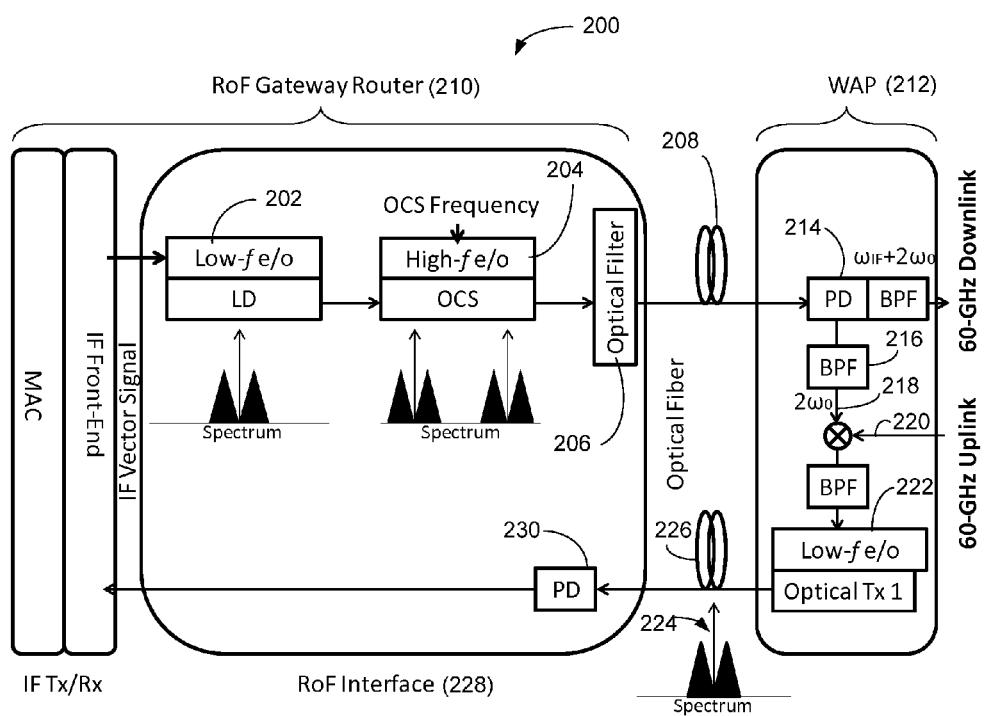
FIG. 2 is an illustrative schematic of a full-duplex 60-GHz radio-over-fiber (RoF) system optical-carrier suppression (OCS) heterodyne system utilizing millimeter wave (mmWave) signals, according to an example implementation of the disclosed technology.

FIG. 2 depicts an example heterodyne OCS (HeteroOCS) system 200 that may utilize a superheterodyne mmWave generation technique according to an example implementation of the disclosed technology. Example embodiments of the HeteroOCS system 200 may fulfill full-duplex mmWave transmission without complicating WAPs. A detailed explanation of the HeteroOCS system 200 will now be discussed.

OCS is a technique that may be utilized, according to example embodiments of the disclosed technology, to double the input frequency (OCS frequency) in order to avoid the bandwidth limitation of electrical-to-optical (e/o) interfaces, such as direct-modulated lasers or Mach-Zehnder modulators (MZM). For example, conventional OCS mmWaves typically generate mmWaves at twice of the frequency as $$s(t) \propto |x(t)\text{Re}\{\exp(j\omega_0 t)\}|^2 \sim \frac{1}{2}|x(t)|^2 \cos(2\omega_0 t),$$

where x(t) is the baseband signal, and $\omega_0$ is the angular frequency of the OCS frequency. Therefore, a conventional system does not provide means for the transmitted signal x(t) to be a vector signal (a complex symbol).

To carry vector signals, embodiments of the disclosed technology utilize a superheterodyne structure (for example, the HeteroOCS system 200) which may first up-convert the baseband signal to an intermediate-frequency (IF) band at lower frequency using, for example, an IF modulation block 202. According to an example implementation of the disclosed technology, a high frequency OCS block 204 may then be utilized to up-convert the IF signal to the desired RF band by modulating the IF signal with a RF carrier signal. According to an example implementation of the disclosed technology, an optical filter 206 may be utilized to filter out the redundant optical sidebands, which may improve the optical-to-radio conversion efficiency and dispersion properties.

According to an example embodiment of the disclosed technology, an optical fiber 208 may carry the RF modulated optical signal from the RoF Gateway Router 210 to the remote WAP 212. Assuming the respective modulation angular frequencies of the IF modulation block 202 and the high frequency OCS block 204 are $\omega_{IF}$ and $\omega_0$ respectively, and neglecting the signals outside the RF band, detection of the RoF signal (HeteroOCS mmWaves) by a photodiode (PD) 214 may be represented by:

$$s'(t) \propto |E_{OCS'}(t)|^2 \sim \frac{1}{2}\cos(2\omega_0 t) + \frac{\alpha}{2}\text{Re}\{x(t)\exp(j(2\omega_0 + \omega_{IF})t)\},$$

where it should be apparent that the detection of HeteroOCS mmWaves by the photodiode 214 may generate a pure carrier at and a RF signal at $(2\omega_0 + \omega_{IF})$. In an example implementation, the pure carrier does not include data, so it may not induce any appreciable interference in the RF band. In the WAP 212, and according to an example implementation of the disclosed technology, the pure carrier 218 may be passed through to an uplink section by a first RF bandpass filter (BPF) 216.

According to an example embodiment of the disclosed technology, an incoming (uplink) RF signal 220 at the WAP (for example, from a user mobile device) may be converted to an IF band signal by utilization of the pure carrier 218 that was described above. For example, the pure carrier 218 may provide a local-oscillation (LO) frequency to down-convert the incoming RF signal 220 to the IF frequency, which may then be utilized for direct modulation of an optical signal by a low-frequency e/o interface 222. In an example implementation, the resulting optical signal 224 may be returned to the RoF interface 228 via optical fiber 226 and detected with a photodiode 230.

According to an example implementation of the disclosed technology, the pure carrier 218 LO frequency may be spontaneously locked with the LO in the RoF gateway router 210 and thus, the amplitudes, phases and frequency of the incoming carrier from uplink RF signal 220 may be preserved in the IF band. According to an example embodiment of the disclosed technology, the electronics of the RoF gateway router 210 may be a wireless IF transceiver, and the wireless transceivers of mobile users may be 60-GHz transceivers. In certain example implementations, using HeteroOCS mmWave generation as disclosed herein, the RoF system may be transparent to both the gateway router and mobile users for improved maintenance, simplified installation, and reduced complexity as compared with conventional indirect mmWave generation methods. For example, according to an example implementation, the WAP 212 may only need to be equipped with the additional mixer and RF band pass filters, which may be low-cost passive devices.

One challenge of generating optical mmWaves mainly lies in the bandwidth limitation and nonlinearity of e/o interfaces, including optical amplitude modulators (AM), optical phase modulators (PM), directly modulated lasers (DML), and photodiodes (PD). The bandwidth of a PD can be increased to almost 100 GHz by shrinking their sizes and increasing the input optical power. However, the bandwidth of optical modulators and DMLs is much more difficult to enhance because it involves the tradeoff between electro-optical effects and electrical resistor-capacitor delays. So far, DMLs of slightly over 20-GHz bandwidth and optical modulators of 40-GHz bandwidth are not uncommon to obtain. However, for millimeter-wave applications, generating RF carriers over 40 GHz can present some challenges.

Linearity may be essential in certain RoF systems. For example, the characteristics of RoF systems are similar to analog transmission systems. Unlike conventional digital baseband signals, the nonlinearity of e/o interfaces induces multiple RF harmonic carriers in RoF systems, which can cause various signal distortions and interferences. Conversely speaking, if this interface nonlinearity is manipulated carefully, it can also be useful to multiply RF carriers that are difficult to be obtained directly.

There are various approaches to overcome the bandwidth limitation and nonlinearity of e/o interfaces. Various types of generation schemes and optical millimeter-waves, according to example embodiments of the disclosed technology, are suitable for various RoF systems, ranging from microwaves to millimeters waves. Below, we summarize the mmWave generation schemes into two major types: the electrical up-conversion and the optical up-conversion, and four types of optical mmWaves are introduced, including optical double-sideband (ODSB), optical single-sideband-plus-carrier (OSSB+C), homodyne optical-carrier-suppression (homoOCS), and heterodyne optical-carrier-suppression (heteroOCS) mmWaves. The RF carrier of interests is focused on 60-GHz mmWaves because of its high potential of multi-gigabit wireless transmission and high-frequency related constraints.

There are two major optical-mmWave generation schemes: the electrical up-conversion and the optical up-conversion. In the electrical up-conversion, baseband signals are first up-converted to the mmWave band by a "pseudo-wireless" transmitter, which may include RF IQ mixers and LOs. For example, instead of feeding the RF signals to an antenna, the "pseudo-wireless" transmitter may feed the mmWave signals directly into an e/o interface to generate optical mmWaves, for example, as shown in the OCS Frequency block 204 of FIG. 2. When the frequency of mmWaves is much higher than the bandwidth of DMLs, an external amplitude modulator may be used. The advantage of electrical up-conversion is its simplicity. Only one e/o interface is needed for one optical mmWave transmitter. Usually there is no special optical modulation technique required in the electrical up-conversion. The simplicity of the o/e interface also may allow any incoming RF signal to be transported through optical fibers directly. The RoF system, from the optical transmitter to the optical receiver, may be transparent to both the uplink and the downlink of the RF transceivers. However, it may be difficult to achieve high signal quality in the mmWave band directly. In addition, when there are many optical mmWave channels present, such as in WDM networks, a large number of ultra-wide-bandwidth e/o interfaces may be required.

According to an example implementation of the disclosed technology, optical up-conversion may separate the baseband modulation and the up-conversion into two stages. For example, low-frequency baseband signals may first be modulated onto a coherent lightwave by a low-frequency e/o interface (such as a DML or an external AM). Then, the optical signals may be up-converted to the mmWave band by the second e/o interface with an RF LO input. Since the baseband modulation is separated from the optical up-conversion, the optical up-conversion may be applied for optical frequency doubling or quadrupling schemes to overcome the e/o-interface bandwidth limitation without distorting the original baseband signals. When there are numerous optical channels in the RoF system, all these optical channels can share a single wide-bandwidth e/o interface for the optical up-conversion, which saves the need of numerous expensive components. However, because the RF signals are generated indirectly, the RoF system usually has to be designed for some specific RF carrier.

Figure 3A:
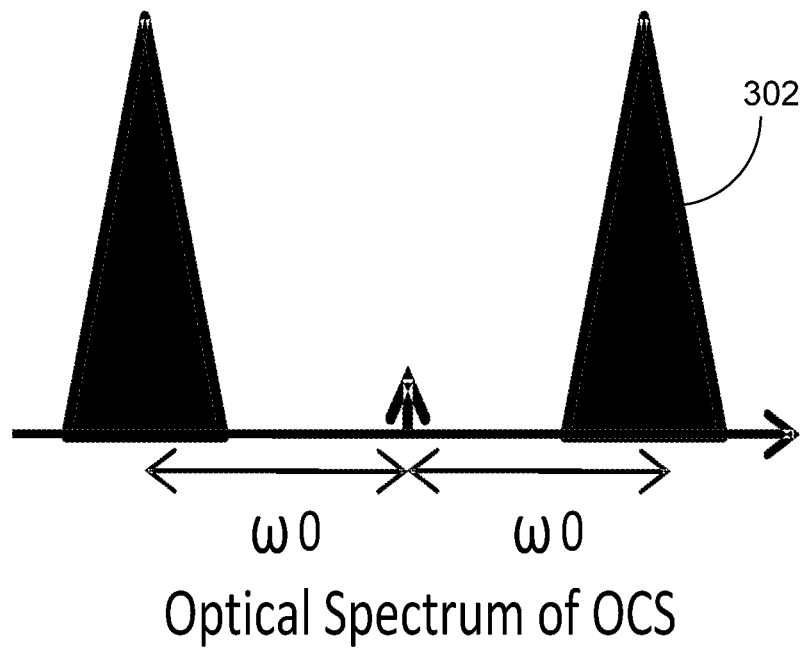
FIG. 3a is a block diagram of an illustrative OCS optical spectra, according to an example implementation.
Figure 3B:
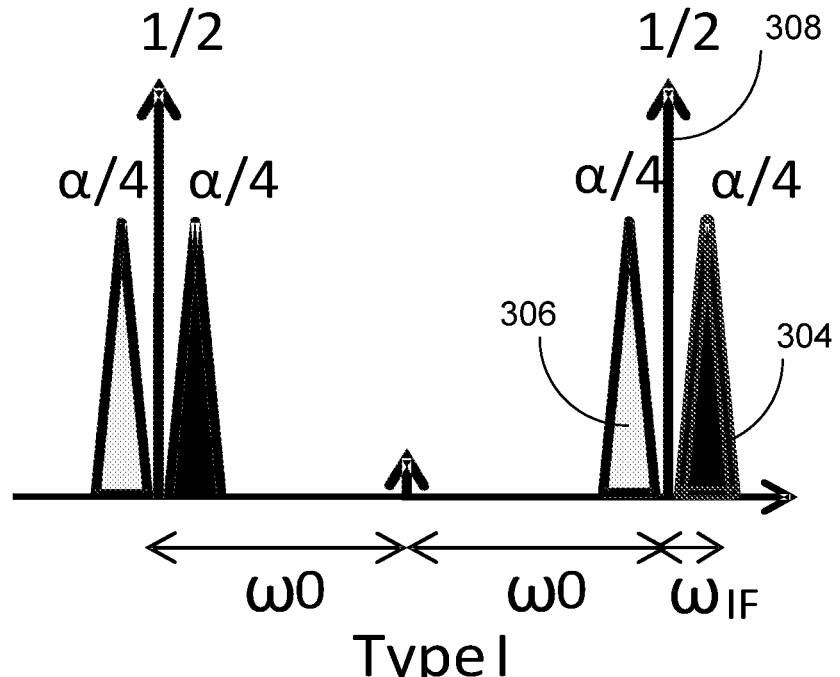
FIG. 3b is a block diagram of an illustrative type-I heterodyne optical-carrier-suppression (HeteroOCS) spectrum, according to an example implementation.
Figure 3C:
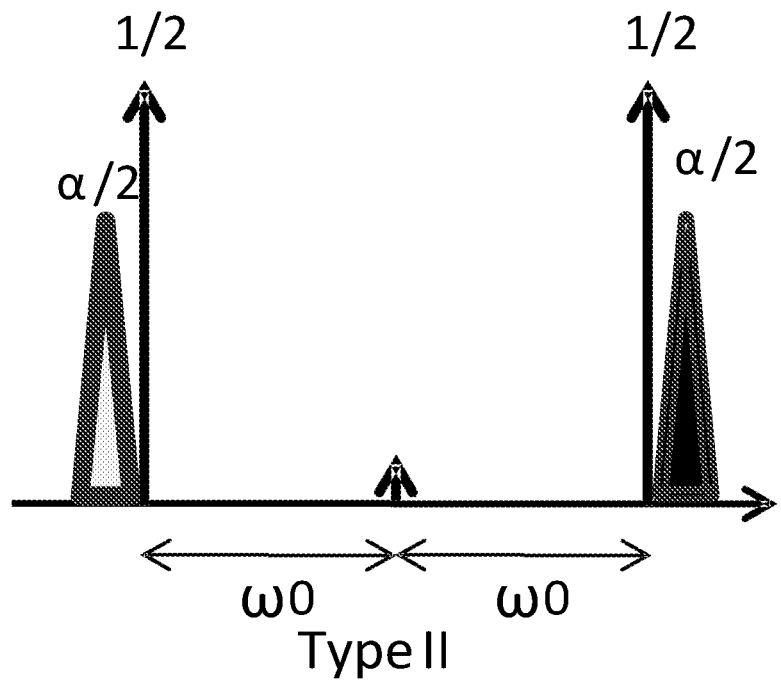
FIG. 3c is a block diagram of an illustrative type-II HeteroOCS spectrum, according to an example implementation.
Figure 3D:
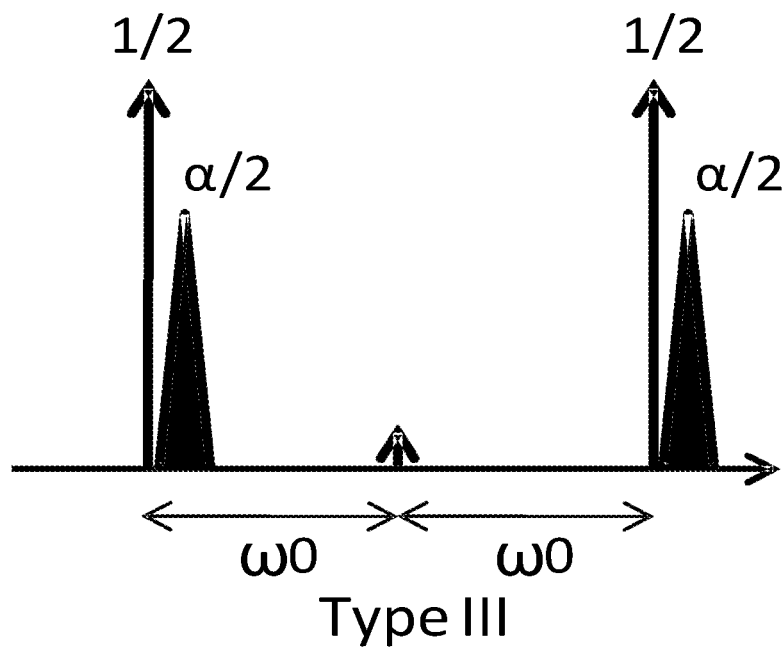
FIG. 3d is a block diagram of an illustrative type-III HeteroOCS spectrum, according to an example implementation.

With different filters and IF modulation schemes, various types of HeteroOCS mmWaves can be generated, according to certain example embodiments of the disclosed technology. FIG. 3A depicts an example optical spectrum of a baseband signal 302 modulated at an OCS angular frequency, $\omega_0$. FIG. 3B depicts an example Type 1 optical spectrum of a Hetero OCS, in which a baseband signal and a phase-shifted replica of the baseband signal are modulated at an intermediate frequency, $\omega_{IF}$, and at the OCS higher frequency, $\omega_0$, resulting in an i-spectrum 304, a q-spectrum 306, and a pure carrier 308. FIG. 3C depicts an example Type II optical spectrum of a Hetero OCS. FIG. 3D depicts an example Type III optical spectrum of a Hetero OCS. Various challenges and benefits of these spectra will now be discussed.

A RF carrier that linearly modulates the intensity of a coherent lightwave can be represented by an ODSB signal. The optical spectrum of an ODSB mmWave signal may represented by an optical central carrier 308 and two complex-conjugated data sidebands 304 306. In certain example embodiments, ODSB signals may be generated from an analog DML or an optical intensity modulator biased at the linear point with an RF-signal input. The electric field of an ODSB signal may be expressed by $$E_{ODSB}(t)/E_0 = 1 + \alpha Re\{x(t)\exp(j\omega_0 t)\},$$

where $E_0$ is the electric field for the purpose of normalization. Being detected by a PD, the beating between the optical central carrier and one of the data sideband generates the electrical signal at the RF band. Assuming the angular frequency of the RF is $\omega_0$ and the complex data symbol is $x(t)$, the generated electrical signal may be expressed by $$s(t) \propto |1 + \alpha Re\{x(t)\exp(j\omega_0 t)\}|^2 \sim 1 + 2\alpha Re\{x(t)\exp(j\omega_0 t)\},$$

where $\alpha$ represents the ratio of the sideband to the optical central carrier. The beating frequency at $2\omega_0$ is neglected here. Therefore, the amplitude and phase information is preserved by the beating of the PD. However, when the ODSB signal travels along the optical fiber, the fiber chromatic dispersion may induce some phase difference between the two data sidebands, resulting in the interference of the two beating RF signals. When the phase difference is zero, the RF signals will have a constructive interference. However, when the phase difference is 180 degree, the two RF signals will incur a destructive interference and RF power fading. The beating RF power may vary periodically with the length of optical fibers, which should be taken into account when designing the length of each RoF link. Nevertheless, the simplicity of ODSB generation makes it suitable for short-distance fiber transmission.

The optical spectrum of OSSB+C mmWaves is similar to the ODSB optical spectrum except that one of the sideband is suppressed. OSSB+C mmWaves can be generated by a dual-arm MZM, whose two RF inputs have a 90-degree phase shift and two bias inputs have $V_\pi/2$ difference. Otherwise, the sideband can also be suppressed by an optical bandpass filter (OBPF). The electric field of an OSSB+C signal can be expressed by $$E_{OSSB+C}(t)/E_0 = 1 + \alpha x(t)\exp(j\omega_0 t).$$

Neglecting out-of-band signals, the electrical signal detected by a PD can be approximated by $$s(t) \propto |1 + \alpha x(t)\exp(j\omega_0 t)|^2 \sim 2\alpha Re\{x(t)\exp(j\omega_0 t)\}.$$

Therefore, the resulting electrical signal is proportional to the original RF electrical signal. Unlike ODSB signals, OSSB+C signals do not have RF power fading. Furthermore, because data are only carried by one sideband, the fiber chromatic dispersion between the sideband and the carrier has a minimal impact on OSSB+C mmWave signals. Therefore, despite the generation of OSSB+C signals is more complicated than ODSB signals, OSSB+C signals may be more reliable when the optical-fiber length is long.

According to an example implementation of the disclosed technology, both ODSB and OSSB+C mmWave signals may be generated by electrical up-conversion, which assures the sensible convenience of downlinks and uplinks. However, the bandwidth of the required o/e conversion interface may need to manage mmWave frequency. 60-GHz mmWaves, for example, may not be easily modulated directly into 60-GHz ODSB or OSSB+C mmWave signals. Using indirect optical up-conversion to double or triple the carrier, however, may be achieved. For example, instead of suppressing one of the sideband, example embodiments of the disclosed technology may utilize optical mmWaves by suppressing the optical central carrier of an ODSB mmWave. For example, OCS can be realized by using a MZM biased at the null point or by using an optical stop-band filter to suppress the optical central carrier. When using an optical filter to suppress the optical central carrier, the two sidebands of OCS mmWave may be generated either by a MZM or by a PM, according to an example implementation.

An example OCS optical spectrum may be represented in FIG. 3A. Using electrical up-conversion, the electric field of the OCS mmWave carrying data symbol $x(t)$ can be expressed by $$E_{OCS}(t)/E_0 = Re\{x(t)\exp(j\omega_0 t)\}.$$

Being detected by a PD, the RF signal is given by $$s(t) \propto |Re\{x(t)\exp(j\omega_0 t)\}|^2 \sim Re\{x^2(t)\exp(j2\omega_0 t)\},$$

where the low-frequency term is neglected. Notice that the RF frequency is doubled because of the OCS technique. Even if the bandwidth of the e/o interface in the transmitter is not enough to generate $2\omega_0$, the $2\omega_0$ mmWave can be still generated by the square law of a PD. Also, notice that the complex data symbol x(t) is squared. This indicates that any modulation format except OOK will be distorted by the OCS mmWave generation. It also means that the RF signals are generated indirectly. Therefore, challenges still remain with the uplink in this scenario.

When using the optical up-conversion, the baseband signal x(t) is modulated separately from the OCS mmWave generation. The electric field of the OCS generation then becomes $$E_{OCS}(t)/E_0 = x(t)Re\{\exp(j\omega_0 t)\}.$$

The RF signal generated by the PD is $$s(t) \propto |x(t)Re\{\exp(j\omega_0 t)\}|^2 \sim \frac{1}{2}|x(t)|^2 \cos(2\omega_0 t).$$

Therefore, the main difference between the electrical and optical up-conversion is that the phase information of the complex data symbol x(t) is completely lost in the optical up-conversion. Because the data symbol is directly modulated onto the RF carrier ($2\omega_0$), this generation method is also known as homodyne OCS (homoOCS).

To preserve the phase information in the optical up-conversion, according to an example implementation, an intermediate frequency (IF) may be utilized to carry the baseband data symbol by $Re\{x(t)\exp(j\omega_{IF} t)\}$ in electrical circuits, where the IF angular frequency $\omega_{IF}$ is usually much lower than RF angular frequency $2\omega_0$. In an example implementation, the IF signals may be directly modulated onto laser lightwaves (either ODSB or OSSB+C). Then OCS mmWave generation can be used as the optical up-conversion method to generate the optical mmWaves as $$E_{OCS'}(t)/E_0 = (1 + \alpha Re\{x(t)\exp(j\omega_{IF} t)\}) \cos(\omega_0 t).$$

The RF signals of the PD becomes $$s(t) \propto |E_{OCS'}(t)|^2 \sim \frac{1}{2}\cos(2\omega_0 t) + \frac{\alpha}{2} Re\{x(t)\exp(j(2\omega_0 + \omega_{IF})t)\},$$

The terms that are lower than $2\omega_0$ may be neglected since low-frequency components are unable to pass through RF amplifiers. The RF carrier carries the complex data symbol at ($2\omega_0 + \omega_{IF}$) without distortion. Another RF carrier at $2\omega_0$ is also generated without carrying any data, which should not cause any interference in the wireless channel. As a result of different IF generation methods, there are variants for the IF-carried OCS mmWave generation methods, as shown in FIGS. 3B-3D.

When there are two sub-sidebands, which both beat at ($2\omega_0 + \omega_{IF}$) with the OCS sidebands, it will have a similar periodic fading effect with ODSB mmWaves because of the chromatic dispersion in fibers (Type-I and Type-II). Otherwise, it is similar to OSSB+C and is more tolerant to the fiber chromatic dispersion (Type-III). Because data symbols are first carried by a low-frequency IF and then up-converted to the mmWave band, this is referred to as heterodyne OCS (HeteroOCS).

In accordance with certain example embodiments, HomoOCS may be the most efficient optical-mmWave generation scheme. However, it is also the only optical mmWave that is unable to carry phase information (or called vector signals) without distortions by a PD. In addition, part of the HeteroOCS power is dedicated to the RF carrier, so the RF conversion efficiency of HeteroOCS mmWaves is low. More importantly, even if not carrying any time-variant signal, the RF powers of ODSB, HeteroOCS Type-I, and HeteroOCS Type-II vary periodically with transmission distances when the fiber chromatic dispersion takes effect along the optical fiber.

Figure 4A:
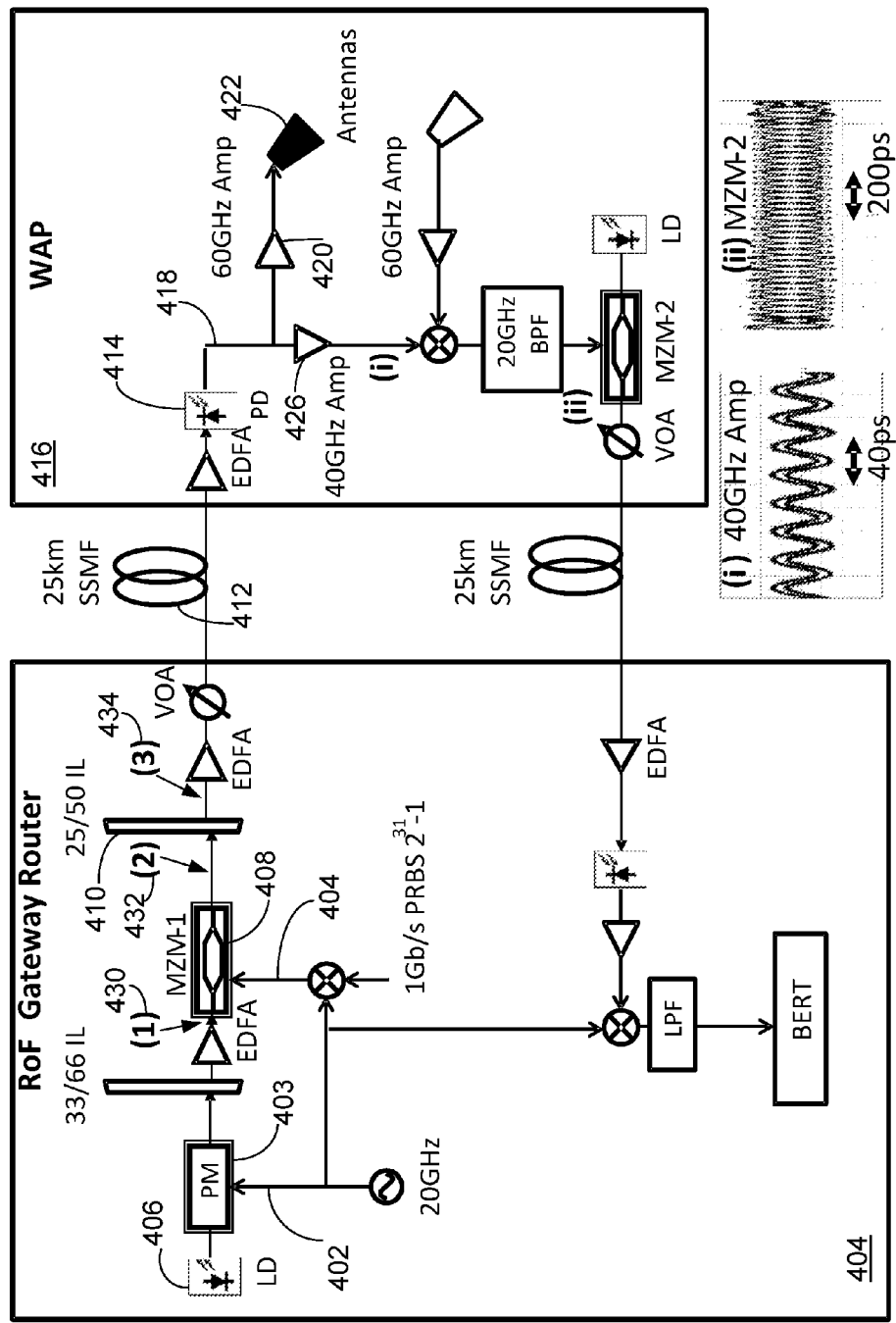
FIG. 4a is a block diagram of an illustrative experimental full-duplex 60-GHz BPSK HeteroOCS mmWave transmission system, according to an example implementation.

A proof of concept experiment setup of a full-duplex 60-GHz BPSK RoF system, according to an example implementation of the disclosed technology, is shown in FIG. 4A. Ideally, the IF should be much lower than the RF (60-GHz), however, in this experimental setup the IF 402 and OCS 404 frequencies are both 20 GHz due to equipment availability limitations at the time of the experiment. In the RoF gateway router 404, and according to an example implementation, the OCS up-conversion may include generation of an optical carrier by a laser 406, which may be modulated at the 20 GHz IF frequency 402 by a phase modulator 403. In an example implementation, a 1-Gb/s@20 GHz BPSK modulation may be carried out by a 20-GHz MZM 408 in series with a 25 GHz/50 GHz optical interleaver (IL) 410, which is used to eliminate the unwanted optical sidebands to generate Type-II HeteroOCS mmWave signals (as shown, for example in FIG. 3C).

Figure 4B:
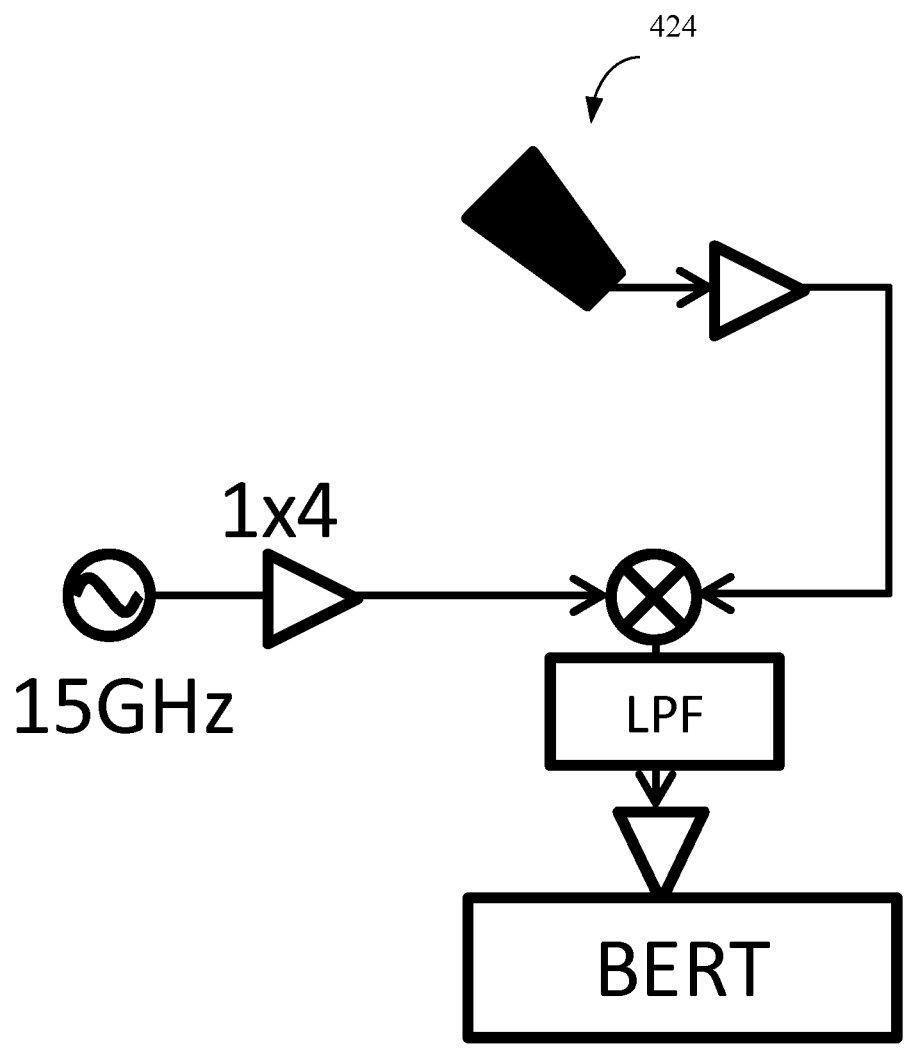
FIG. 4b is a block diagram of an illustrative receiver setup, according to an example implementation.

After propagating over a 25-km standard single-mode fiber (SSMF) 412, and according to an example implementation, a 60-GHz bandwidth PD 414 in the WAP 416 may be used to detect the RF signals 418. According to an example implementation of the disclosed technology, the detected RF signals 418 may be split into two paths. One of the signals may pass through a 60-GHz RF amplifier 420 and may be sent wirelessly by a 15-dBi horn antenna 422 to an 60-GHz receiver 424 (see FIG. 4B). In this example, the 15-dBi horn antenna 422 and the 60-GHz receiver 424 are separated by 2 meters. The other RF signal 418 may pass through a narrow-band 40-GHz RF amplifier to pass its LO frequency for uplink of incoming RF signals, as described with reference to FIG. 2.

FIGS. 5A, 5B, and 5C, respectfully depict the measured optical spectra that are shown for the corresponding locations (1) 430, (2) 432, (3) 434 of the experiment setup as shown in FIG. 4A.

Figure 6:
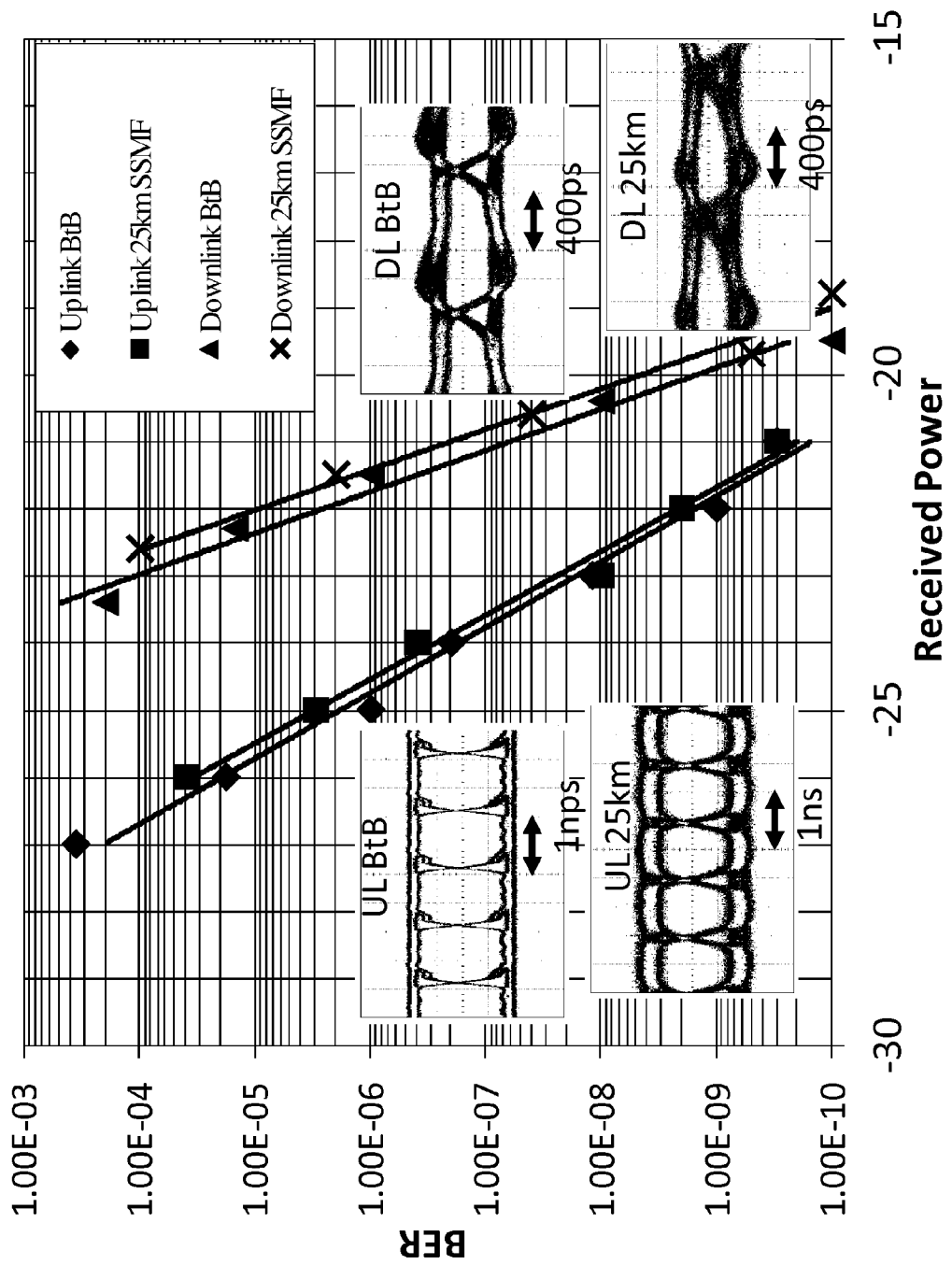
FIG. 6 shows measured bit error rate (BER) versus received power of the 1 Gb/s BPSK HeteroOCS mmWave downlink and uplink transmission according to an example implementation.

FIG. 6 shows eye diagrams and measured bit error rate (BER) versus received power for the experimental setup as shown in FIG. 4A. The power penalty at BER 10-9 of 25-km-SSMF transmission is about 0.7 dB and negligible for the downlink transmission and the uplink transmission respectively.

Example embodiments of the disclosed technology utilize a HeteroOCS mmWave generation scheme to overcome the limitations of conventional OCS mmWave signals for gigabit wireless vector transmission in radio over fiber systems. A proof-of-concept experiment of a full-duplex 60-GHz BPSK HeteroOCS system has been demonstrated. Embodiments of the RoF technique disclosed herein may be integrated with the most advanced wireless modulation and transport systems such as LTE and WiMax for wireless vector signal transmissions in both directions.

Figure 7:
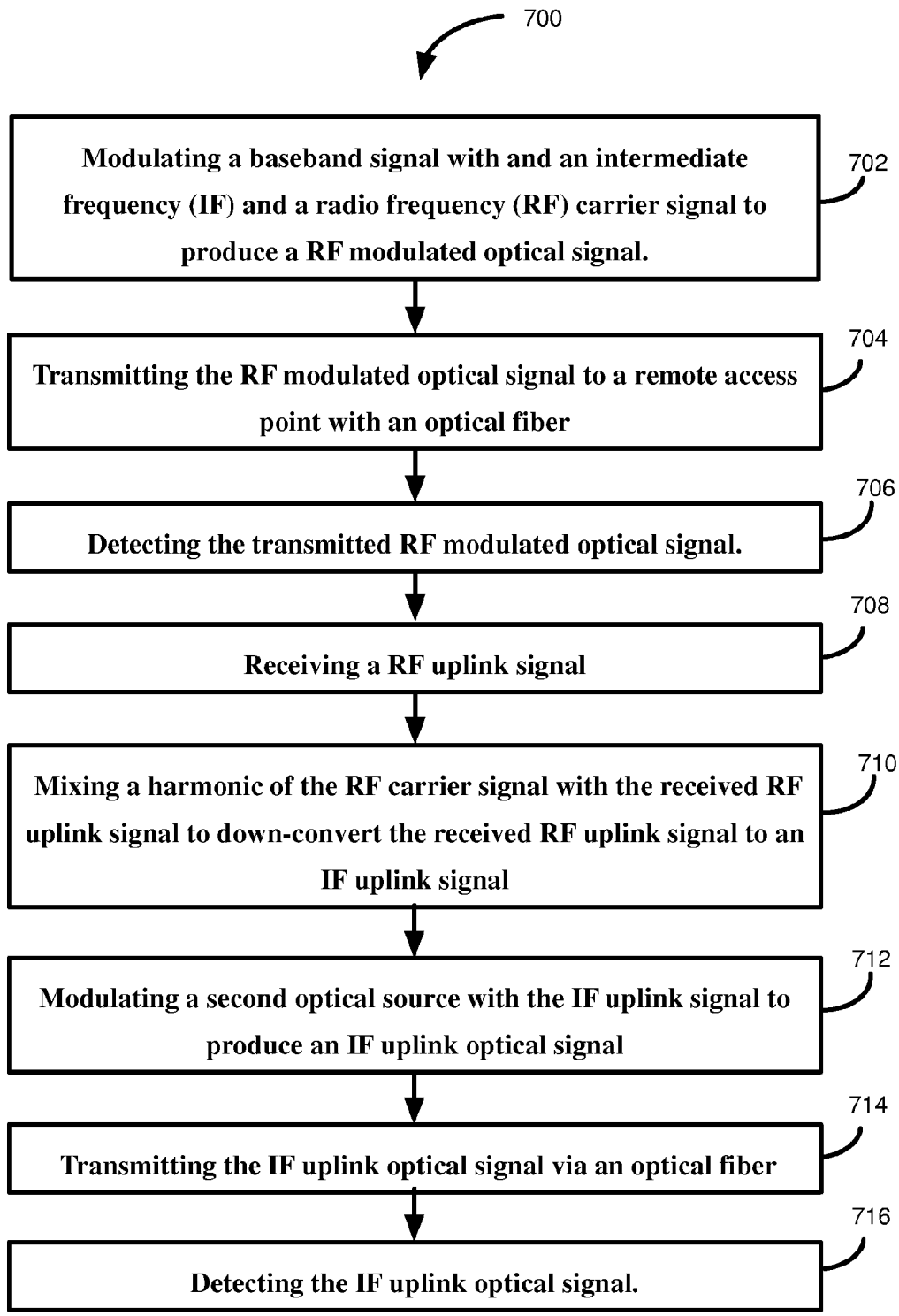
FIG. 7 is a flow diagram for a method, according to an example implementation of the disclosed technology.

An example method 700 for providing carrier-embedded optical radio-over-fiber (RoF) communications will now be described with reference to the flowchart of FIG. 7. The method 700 starts in block 702, and according to an example implementation includes modulating a baseband signal with and an intermediate frequency (IF) and a radio frequency (RF) carrier signal to produce a RF modulated optical signal. In block 704, the method 700 includes transmitting the RF modulated optical signal to a remote access point with an optical fiber. In block 706, the method 700 includes detecting the transmitted RF modulated optical signal. In block 708, the method 700 includes receiving a RF uplink signal. In block 710, the method 700 includes mixing a harmonic of the RF carrier signal with the received RF uplink signal to down-convert the received RF uplink signal to an IF uplink signal. In block 712, the method 700 includes modulating a second optical source with the IF uplink signal to produce an IF uplink optical signal. In block 714, the method 700 includes transmitting the IF uplink optical signal via an optical fiber. In block 716, the method 700 includes detecting the IF uplink optical signal.

Modulating the electronic baseband signal with the intermediate frequency (IF) signal and the radio frequency (RF) carrier signal to produce the RF modulated optical signal may be implemented in several different ways. For example, one implementation may include modulating a first optical source (or light produced by the first optical source) with the electronic baseband signal and the IF signal to produce an optical IF signal, then modulating the optical IF signal with the RF carrier signal to produce the RF modulated optical signal. One implementation of this example embodiment may include first mixing of the electronic baseband signal and an electronic IF signal. In one example implementation, this mixed electronic baseband and IF signal may be used for direct modulation of a laser diode to produce the optical IF signal. According to an example implementation of the disclosed technology, the RF modulated optical signal may be generated by sending the optical IF signal through an optical modulator (such as a Mach-Zehnder interferometer modulator, for example) and driving the modulator with an electronic RF signal.

Another example implementation may reverse the order of the application of the IF and RF signals as described above. For example a first optical source (or light produced by the first optical source) may be modulated with the electronic baseband signal and an electronic RF carrier signal to produce an optical RF signal, then modulating the optical RF signal with an IF signal to produce the RF modulated optical signal. One implementation of this example embodiment may include first mixing of the electronic baseband signal and the electronic RF carrier signal. In one example implementation, this mixed electronic baseband and RF signal may be used for direct modulation of a laser diode to produce the optical RF signal. According to an example implementation of the disclosed technology, the RF modulated optical signal may be generated by sending the optical R signal through an optical modulator (such as a Mach-Zehnder interferometer modulator, for example) and driving the modulator with an electronic IF signal.

Yet another example implementation may mix the baseband signal, the IF signal, and the RF carrier signal in the electronic domain, then utilize this mixed signal to directly modulate a light source (such as a laser diode) to produce the RF modulated optical signal. A variant of this approach, according to an example embodiment, may modulate, with this mixed signal, the light produced by the light source, but via a modulator to produce the RF modulated optical signal.

An example embodiment may also include filtering the RF modulated optical signal to remove redundant optical sidebands. According to an example implementation of the disclosed technology, the remote access point comprises a wireless access point (WAP) for wireless communications. In an example implementation, the access point signal may be represented by $$\frac{1}{2}\cos(2\omega_0 t) + \frac{\alpha}{2}\text{Re}\{x(t)\exp(j(2\omega_0 + \omega_{IF})t)\},$$

wherein where x(t) is the baseband signal, $\omega_0$ is the angular frequency of the RF carrier signal, $\omega_{IF}$ is the angular frequency of the IF signal, and $\alpha$ is an amplitude factor. According to an example implementation of the disclosed technology, detecting the transmitted RF modulated optical signal yields a frequency doubled harmonic signal at twice the frequency of the RF carrier. In an example implementation, the first and second optical fiber may the same optical fiber. In an example implementation, the first and second optical fibers may be separate optical fibers. In an example embodiment, modulating the IF signal with the RF carrier includes modulating the IF signal at frequencies ranging between 40 and 80 GHz. In an example implementation, modulating the IF signal with the RF carrier comprises modulating the IF signal at frequencies ranging between 58 and 62 GHz. In certain example implementations, modulating the IF signal with the RF carrier comprises modulating the IF signal at frequencies up to 300 GHz. According to an example embodiment, transmitting the RF modulated optical signal to the remote access point may include transmitting the RF modulated optical signal by the optical fiber over a distance of greater than 10 meters.

According to example implementations, certain technical effects can be provided, such as creating certain systems and methods that provide simplified installation, and reduced complexity as compared with conventional indirect mmWave generation methods. Example implementations of the disclosed technology can provide the further technical effects of providing systems and methods for utilizing transmitted carrier signals for uplinking incoming RF signals to preserve phase information.

In example implementations of the disclosed technology, the heterodyne OCS (HeteroOCS) system 200 may include any number of hardware and/or software applications that are executed to facilitate any of the operations. In example implementations, one or more I/O interfaces may facilitate communication between the HeteroOCS system 200 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the HeteroOCS system 200. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the HeteroOCS system 200 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the HeteroOCS system 200 with more or less of the components illustrated in FIG. 2 or 4A Certain implementations of the disclosed technology are described above with reference to block and flow diagrams of systems and methods according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method for providing carrier-embedded optical radio-over-fiber (RoF) communications, the method comprising:
   producing a radio frequency (RF) modulated optical signal that is associated with a first optical source and modulated with an electronic baseband;
   producing an intermediate frequency (IF) signal;
   producing a RF carrier signal;
   transmitting, by a first optical fiber, the RF modulated optical signal from the RoF Gateway Router to a remote access point;
   detecting, at the remote access point, the transmitted RF modulated optical signal to produce an electrical remote access point signal, wherein the remote access point signal is represented by $(1/2)\cos(2\omega_0 t)+(\alpha/2)\text{Re}\{x(t)\exp(j(2\omega_0+\omega_{IF})t)\}$, wherein where $x(t)$ is the baseband signal, $\omega_0$ is the angular frequency of the RF carrier signal, $\omega_{IF}$ is the angular frequency of the IF signal, and $\alpha$ is an amplitude factor;
   filtering the remote access point signal to pass a harmonic of the RF carrier signal to an uplink section of the remote access point;
   receiving a RF uplink signal;
   mixing the harmonic of the RF carrier signal with the received RF uplink signal to down-convert the received RF uplink signal to an IF uplink signal;
   modulating a second optical source or light from the second optical source with the IF uplink signal to produce an IF uplink optical signal;
   transmitting, by a second optical fiber, the IF uplink optical signal from the remote access point to the RoF Gateway Router; and
   detecting, at the RoF Gateway Router, the IF uplink optical signal.

2. The method of claim 1, wherein the producing the radio frequency (RF) modulated optical signal comprises:
   modulating the first optical source or light produced by the first optical source with the electronic baseband signal and the IF signal to produce an optical IF signal; and
   modulating the optical IF signal with the RF carrier signal to produce the RF modulated optical signal.

3. The method of claim 1, wherein the producing the radio frequency (RF) modulated optical signal comprises:
   modulating the first optical source or light produced by the first optical source with the electronic baseband signal and the RF carrier signal to produce an optical RF signal; and
   modulating the optical RF signal with the IF signal to produce the RF modulated optical signal.

4. The method of claim 1, wherein the producing the radio frequency (RF) modulated optical signal comprises:
   mixing the electronic baseband signal with an electronic IF signal and an electronic RF carrier signal to produce a RF modulated electronic signal; and
   modulating the first optical source or light produced by the first optical source with the RF modulated electronic signal to produce the RF modulated optical signal.

5. The method of claim 1, further comprising filtering the RF modulated optical signal to remove redundant optical sidebands.

6. The method of claim 1, wherein the remote access point comprises a wireless access point (WAP) for wireless communications.

7. The method of claim 1, wherein detecting the transmitted RF modulated optical signal yields a frequency doubled harmonic signal at twice the frequency of the RF carrier.

8. The method of claim 1, wherein the first and second optical fiber are the same optical fiber.

9. The method of claim 1, wherein the RF carrier comprises a signal having frequencies ranging between 40 and 80 GHz.

10. The method of claim 1, wherein the RF carrier comprises a signal having frequencies ranging between 58 and 62 GHz.

11. The method of claim 1, wherein transmitting the RF modulated optical signal to the remote access point comprises transmitting the RF modulated optical signal by the optical fiber over a distance of greater than 10 meters.

12. A system for providing carrier-embedded optical radio-over-fiber (RoF) communications, the system comprising:
   a Radio over Fiber (RoF) Gateway router, comprising:
      a first optical source;
      an optical modulator; and
      a first detector;
   a first optical fiber;
   a second optical fiber;
   a remote access point, comprising:
      a second detector
      a band pass filter;
      an RF mixer; and
      a second optical source;
   wherein the system is configured to
      produce a radio frequency (RF) modulated optical signal that is associated with a first optical source and modulated with an electronic baseband;
      produce an intermediate frequency (IF) signal;
      produce a RF carrier signal;

transmit, by the first optical fiber, the RF modulated optical signal from the RoF Gateway Router to the remote access point;

detect, by the second detector at the remote access point, the transmitted RF modulated optical signal to produce an electrical remote access point signal, wherein the remote access point signal is represented by $(½)\cos(2\omega_0 t)+(\alpha/2)\text{Re}\{x(t)\exp(j(2\omega_0+\omega_{IF})t)\}$, wherein where $x(t)$ is the baseband signal, $\omega_0$ is the angular frequency of the RF carrier signal, $\omega_{IF}$ is the angular frequency of the IF signal, and $\alpha$ is an amplitude factor;

filter, with the band pass filter, the remote access point signal to pass a harmonic of the RF carrier signal to an uplink section of the remote access point;

receive, at the remote access point, a RF uplink signal;

mix, with the RF mixer, the harmonic of the RF carrier signal with the received RF uplink signal to down-convert the received RF uplink signal to an IF uplink signal;

modulate the second optical source with the IF uplink signal to produce an IF uplink optical signal;

transmit, by the second optical fiber, the IF uplink optical signal from the remote access point to the RoF Gateway Router; and detect, by the first detector at the RoF Gateway Router, the IF uplink optical signal.

13. The system of claim 12, wherein the system is configured to produce a radio frequency (RF) modulated optical signal by:

modulating the first optical source or light produced by the first optical source with the electronic baseband signal and the IF signal to produce an optical IF signal; and modulating the optical IF signal with the RF carrier signal to produce the RF modulated optical signal.

14. The system of claim 12, wherein the system is configured to produce a radio frequency (RF) modulated optical signal by:

modulating the first optical source or light produced by the first optical source with the electronic baseband signal and the RF carrier signal to produce an optical RF signal; and modulating the optical RF signal with the IF signal to produce the RF modulated optical signal.

15. The system of claim 12, wherein the system is configured to produce a radio frequency (RF) modulated optical signal by:

mixing the electronic baseband signal with an electronic IF signal and an electronic RF carrier signal to produce a RF modulated electronic signal; and modulating the first optical source or light produced by the first optical source with the RF modulated electronic signal to produce the RF modulated optical signal.

16. The system of claim 12, wherein the RoF Gateway Router further comprises an optical filter to remove redundant optical sidebands from the RF modulated optical signal.

17. The system of claim 12, wherein the remote access point further comprises a wireless access point (WAP) for wireless communications.

18. The system of claim 12, wherein the electrical remote access point signal comprises a RF carrier signal component at twice the frequency of the RF carrier.

19. The system of claim 12, wherein the first and second optical fiber are the same optical fiber.

20. The system of claim 12, wherein the RF carrier comprises frequencies ranging between 58 and 62 GHz.

21. The system of claim 12, wherein the first optical fiber transmits the optical signal from the RoF Gateway Router to the remote access point over a distance greater than 10 meters.

22. An apparatus for providing carrier-embedded optical radio-over-fiber (RoF) communications, the apparatus comprising:

a remote access point, comprising:
  a detector
  a band pass filter;
  an RF mixer; and
  an optical source; and
  an optical fiber;

wherein the apparatus is configured to receive an RF modulated optical signal, the optical signal comprising a RF carrier signal;

detect, by the detector, the RF modulated optical signal to produce an electrical remote access point signal, wherein the remote access point signal is represented by $(½)\cos(2\omega_0 t)+(\alpha/2)\text{Re}\{x(t)\exp(j(2\omega_0+\omega_{IF})t)\}$, wherein where $x(t)$ is the baseband signal, $\omega_0$ is the angular frequency of the RF carrier signal, $\omega_{IF}$ is the angular frequency of the IF signal, and $\alpha$ is an amplitude factor;

filter, with the band pass filter, the remote access point signal to pass a harmonic of the RF carrier signal to an uplink section of the remote access point;

receive a RF uplink signal;

mix, with the RF mixer, the harmonic of the RF carrier signal with the received RF uplink signal to down-convert the received RF uplink signal to an IF uplink signal;

modulate the optical source with the IF uplink signal to produce an IF uplink optical signal; and transmit, by the optical fiber, the IF uplink optical signal.

23. The apparatus of claim 22, wherein the remote access point comprises a wireless access point (WAP) for wireless communications.

24. The apparatus of claim 22, wherein the RF carrier signal comprises frequencies up to 300 GHz.

* * * * *